UNITED STATES PATENT OFFICE.

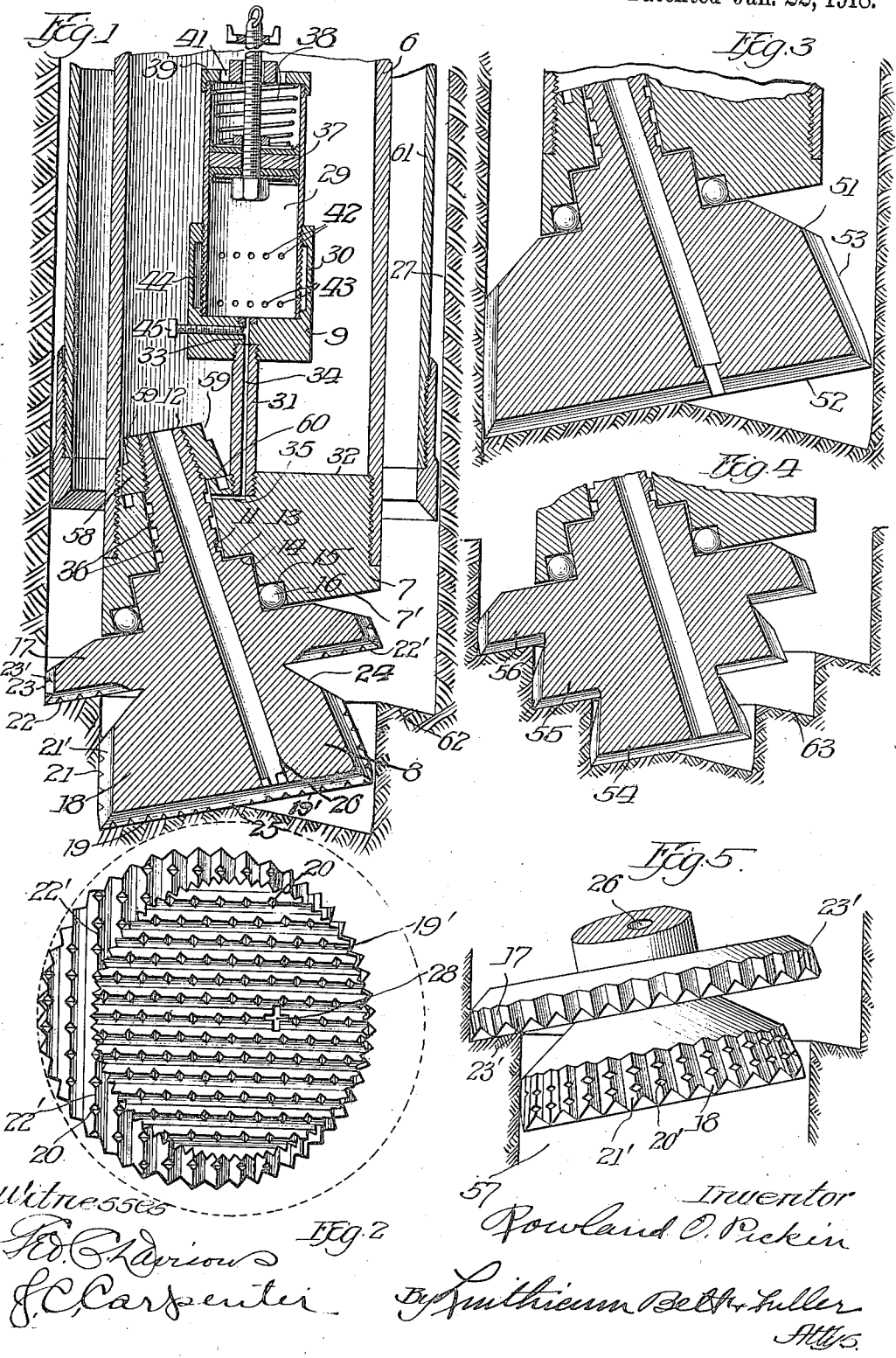

ROWLAND O. PICKIN, OF CHICAGO, ILLINOIS.

DRILL.

1,254,267.  Specification of Letters Patent.  Patented Jan. 22, 1918.

Application filed December 17, 1913. Serial No. 807,174.

*To all whom it may concern:*

Be it known that I, ROWLAND O. PICKIN, a subject of the King of Great Britain, residing at Chicago, in the county of Cook and State of Illinois, have invented certain new and useful Improvements in Drills, of which the following is a specification.

My present invention relates in general to boring drills and has for one of its primary objects to provide a drill for boring into earth, rock and the like, which will comprise a novel cutting tool adapted to cut and loosen the rock or other material by a crushing and pulverizing action as the tool is moved over the surface or surfaces to be cut.

Another object of the invention is the provision of a tool having a plurality of cutting faces so constructed and arranged that the pressure exerted upon one face of the cutting tool will react to bring a second face into strong cutting operation.

A further object of the invention is to provide a drill which will cut a hole larger than the maximum horizontal dimension of the tool, so that any pieces of rock or other material being dislodged above the bottom of the tool during the boring operation may fall down beneath the tool and be ground up instead of becoming lodged upon the top of the tool or wedged between the parts of the drill as has been found to be frequently the case where a tool cuts a hole equal substantially to the diameter of the tool itself.

A still further object of the invention is to provide a drill, the parts of which will be so constructed and arranged that a pipe, tube or other casing may be inserted in the hole cut by the drill and moved downwardly as the hole is deepened under the action of the drill and the drill removed thereafter through this tube or casing.

Other objects and advantages of the invention will be apparent as it is better understood from the following description when taken in connection with the accompanying drawing illustrating preferred embodiments thereof.

On the drawing,

Figure 1 is a vertical sectional view taken on the central axis of a roller drill embodying my invention and showing the device in the operation of boring a hole in the earth;

Fig. 2 is a bottom plan view of the roller drill shown in Fig. 1;

Figs. 3 and 4 are partial vertical views taken similarly to that shown in Fig. 1 of somewhat modified forms of the cutting tool, and

Fig. 5 is a side elevation of the cutting tool shown in Fig. 1, showing the application of this tool as a reamer for the enlargement of a hole already bored.

The embodiment of the invention shown in Fig. 1 consists primarily of a hollow tube or drill rod 6 that is closed at its lower end by a head 7 carrying a cutting tool 8 and a lubricating device 9. The hollow drill rod which is the operating member of the drill extends above the surface of the ground where suitable devices which form no part of my present invention and which are, therefore, not shown on the drawing are provided to rotate the rod and subject it to sufficient pressure to cause the cutting tool to crush away the material.

The head 7 preferably terminates at its bottom in a flat inclined face 7' and is provided with an inclined bearing aperture 11 for a shank 12 of the cutting tool, so that as the drill rod or tube is rotated the cutting tool will be given a gyratory action. The bearing aperture 11 is preferably enlarged at 13 to provide a shoulder against which a companion shoulder 14 formed on the shank of the cutting tool bears when the parts are operated and is also further enlarged at 15 to accommodate anti-friction members 16 interposed between the cutting tool and head 7, as shown in Fig. 1.

The tool 8 is preferably provided with two or more cutting portions 17 and 18, each of frusto-conical shape. The lower face 19 of the lower frusto-conical portion 18 is formed of a plurality of cutting teeth so that all portions of this face are capable of crushing away the material beneath the tool as the various portions of this face come in contact therewith. The curved side 21 of this frusto-conical portion is also formed of cutting teeth which bear against and wear away to a certain extent the sides of the hole as the tool is operated. The upper portion 17 in the present instance is formed integrally with the lower portion and is of larger diameter so that its bottom face 22 extends outwardly beyond the bottom face 19 of the portion 18. The outwardly extending portion of this face is also formed of cutting teeth as is also the curved face 23. The teeth on the lower faces 19 and 22 may have any desired form and are shown for the purposes of illustration as consisting of a plurality of parallel ribs 19' and 22' extending across these faces in a single direction. These ribs are recessed or notched at regular intervals transversely at 20 and provide in effect a plurality of outwardly projecting cutting teeth. The teeth on the faces 21 and 23 are also formed of a plurality of ribs 21' and 23' extending upwardly across these faces and these ribs also may be notched, if desired, as at 20' in Fig. 5. The inclination of the bearing aperture 11 in the head 7 is such that one element of each frusto-conical face is disposed vertically when the tool is in cutting position. The lower frusto-conical portion 18 is cut away just beneath the upper portion 17 at 24 to provide pockets beneath the lower cutting surface 22 of the upper portion in which the pulverized earth may collect until it is washed away by water, as will be later explained.

To permit the tool to turn easily in the hole such portion of the outer face of the lowermost portion 18 as cuts beneath a horizontal plane passing through the center of gyration is cut away to give this portion a spherical formation of radius equal to the distance between the center of gyration and the vertically disposed element of the curved surface of this portion of the tool. It will be noted by viewing Fig. 1 that in the present instance this portion is relatively small so that the general frusto-conical shape of the tool is not affected thereby.
Both the cutting faces 19 and 22 are disposed at right angles to the axis of the cutting tool and the face 19 of the lower portion is preferably located at the intersection of the axes of the cutter and of the operating rod or tube 6, so that the center of gyration 25 of the cutter is located in the center of the plane of this face. When the tool is operated the sediment resulting from the crushing of the material being bored is washed out by water forced down through the operating rod and to this end an aperture 26 is provided through the cutting tool. This aperture is inclined to the axis of the cutting tool and extends from the center of the upper end of the shank 12 at the top to some point intermediate the center 25 of the face 19 and its outer edge so that as the tool moves in service the lower end of this aperture moves about a circular path, thereby changing constantly the direction of the flow of water from the cutter. The water after passing through the cutter passes in and around the cutting faces and up between the outer face of the rod or tube 6 and the sides 27 of the hole. The aperture 26 is formed at and adjacent the face 19 into the cross-like opening 28, this form of opening being believed to possess peculiar advantages in that it can not readily become clogged by reason of a pebble becoming wedged in the opening, the force of the water itself being sufficient to prevent the accumulation of matter which would eventually obstruct the passage of the water.

In order that the cutting tool may move easily in the head without binding I provide an improved lubricating device which will now be described. From a practical point of view it is impossible to construct rock drills and the like so that a water-tight fit is present between the parts. It is, therefore, necessary if the lubricant is to reach the surfaces between which its presence is most desired that it be subjected to pressure slightly greater, especially when boring at an angle, than that exerted by the water so that the entrance of the lubricant itself is enabled to prevent the water forcing it back into its receptacle. The lubricating device 9 consists in the present embodiment of a receptacle 29 adapted to contain a lubricating agent. The lower end of the receptacle 29 is mounted in a casing 30 carried upon a stem 31 threaded into the upper face 32 of the drill head 7. Through the bottom of the casing an aperture 33 provides a passageway which registers with a similar passageway 34 extending through the stem 31. An aperture 35 in the head communicates with the passageway 34 in the stem and with the bearing 11 in which the shank 12 of the cutter is positioned. In the present instance the shaft is provided with a plurality of rings or ribs 36 between and about which the lubricating agent may move as the drill is manipulated. These rings or ribs are provided primarily to allow a fishing tool to grasp the shaft should the cutting tool become detached in the hole.

A piston 37 is mounted within the receptacle 29 and is forced down upon the lubricating agent by a spring 38 bearing at one end against the upper face of the piston and at the other against the head 39 into which the outer end of the receptacle is threaded. The head 39 is provided with a plurality of apertures 41 through which the water in the rod or tube 6 passes and exerts a pressure upon the head equal to the pressure of the water in the tube. This pressure is in addition to the pressure exerted by the spring 38 so that the piston bears upon the lubricating agent with a force greater than the water pressure by the amount added by the spring. In order that the pressure of the water beneath the head may not force the water and the cuttings carried thereby upwardly between the shank of the cutting tool and its bearing, when the lubricant has become exhausted and the head of the piston rests in its lowermost position, I provide means for conveying the water that has entered the receptacle through the apertures 41 past the piston head and down through the passageways 33, 34 and 35. A number of apertures 42 are drilled through the receptacle 29 in a circle located just above the upper face of the piston when the piston is in lowermost position and a similar circle of apertures 43 is provided beneath the lower face of the piston. In the casing 30 opposite these apertures and establishing communication between them is a recess 44 which permits the water behind the piston to pass the piston and flow down into the bearing after the lubricating agent has been exhausted. This water not only prevents the water which has flowed through the aperture 26 in the cutting tool from passing up around the bearings with the particles, but also provides against the over-heating of the bearings until such time as the tool is withdrawn from the hole. After the lubricating agent is exhausted, therefore, water not only flows continually downwardly through the apertures 36 but through the receptacle 29, passageways 33, 34 and 35, and the bearing 11. In the casing 30 a regulating screw 45 is provided to regulate the feed of the lubricating agent through passageway 36, this screw being shown in Fig. 1 in its outermost inoperative position.

The embodiment of the invention shown in Fig. 3 differs only from that already described in that the cutting tool 51 is provided with a single frusto-conical cutting portion having a flat cutting face 52 disposed at right angles to the inclined axis of the tool and having also a single curved cutting face 53, an element of which is disposed in a vertical plane, as shown at the left in the figure. The embodiment shown in Fig. 4 differs from those already described in providing three frusto-conical portions 54, 55 and 56, the portion 54 being like the portions 51 and 18 of the embodiments already described and the portions 55 and 56 like the portion 17 of the embodiment shown in Fig. 1. The cutting teeth of the two embodiments shown in Figs. 3 and 4 may have any desired form, but for the purposes of illustration are shown as constructed like the teeth in the embodiment disclosed in Figs. 1 and 2.

Either of the embodiments shown in Figs. 1 and 4 may be used as a reamer to enlarge a hole cut by a similar and smaller tool, as shown in Fig. 5, it being preferable, however, that the smaller hole 57 be substantially equal to the diameter of one of the smaller frusto-conical portions 18 so that the hole itself may guide the tool in its reaming action by contact with a lower frusto-conical portion while an upper frusto-conical portion 17 is cutting away the material.

The parts of the tool are assembled by securing the cutter and lubricating device to the drill head before the drill head is fastened to the rod or tube 6. This is accomplished by threading the shank 12 through its bearing 11 and fastening it in place by a lock nut 58 formed at 59 to receive a spanner or wrench, a portion 60 of the upper face 32 of the head 7 being cut away in a plane at right angles to the axis of the cutter, so that the locking nut 58 may turn easily in contact therewith. The lubricating device is positioned by threadedly engaging the casing 30 with the stem 31 and this stem with the head 7.

It will be apparent that as the tool is operated the gyratory movement of the cutter will force the tool always to cut on a line higher at the center than at its end so that the pressure applied to the tool will react outwardly to force the vertically disposed elements of the curved surfaces of the frusto-conical portions into contact with adjacent lines on the side wall of the hole so that all cutting surfaces co-act through the pressure felt by the rod to grind and crush away the material in which the tool is operated. The rotation of the rod or tube 6 under the pressure causes a lagging independent rotation of the tool so that successive portions of the tool are brought into cutting operation.

It will be apparent also that either of the cutters shown in Figs. 1 and 4 will cut larger holes than the maximum horizontal diameters of the tools, so that room is provided about the tool for any pieces of rock or earth falling from above the tool to work their way past the tool and be crushed to powder and carried up and out of the hole by the water. This feature also permits a pipe 61 to follow the drill as it cuts its way into the rock or other formation, it only being necessary that the internal diameter of the pipe permit the tool to pass upwardly therethrough when it is desired to withdraw the drill. When this operation is performed the tool is lifted until the lowermost portion is above the surface 62 in Fig. 1 and 63 in Fig. 4 on which the frusto-conical portion next above has been operating so that it may be moved over to position the largest frusto-conical portion centrally of the pipe and permit it to pass up therethrough.

It will be obvious that various changes may be made in the form, construction and arrangement of the parts without departing from the spirit and scope of the invention or sacrificing any of its material advantages, the forms hereinbefore disclosed being merely preferred embodiments thereof.

I claim:

1. A boring tool mounted to roll upon the surface to be removed, said tool having a crushing surface lying in straight radial lines, and mounted on an axis inclined to the axis of the bore, and means for gyrating said tool around the axis of the bore, said axes intersecting at the center of the tool face.

2. In a drill, the combination of a cutter mounted on an axis inclined to the hole and provided with a plurality of substantially flat cutting faces disposed in different planes at right angles with the longitudinal axis of said cutter, and means for revolving said cutter about an axis coincident with the axis of the hole to be bored.

3. In a drill, the combination of an operating member, and a cutter mounted in said operating member with its longitudinal axis inclined to the longitudinal axis of said operating member, said cutter being provided with a plurality of flat faces disposed in different planes substantially at right angles to the axis of said cutter and provided with a plurality of cutting teeth.

4. In a drill, the combination of an operating member, a head carried by said member, and a cutter having a flat cutting face disposed in a plane substantially at right angles to the longitudinal axis of said cutter, said cutter being secured in the head at an angle, the longitudinal axes of the cutter and operating member intersecting at the cutting plane of said face.

5. In a drill, the combination of a hollow operating member adapted to conduct water, a head closing the lower end of said member, a cutter pivotally mounted in said head, a receptacle for containing a lubricating agent carried within said head, means providing a passageway between said receptacle and said cutter, and means for establishing communication between said passageway and the water in said member when the lubricating agent is exhausted.

6. In a drill, the combination of a hollow operating member adapted to conduct water, a head closing the lower end of said operating member, a cutter pivotally mounted in said head, a lubricant-containing receptacle disposed within said member, means providing a passageway between said receptacle and said cutter, a piston mounted in said receptacle, one face of said piston being subject to the pressure exerted by the water within said member and the other transmitting said pressure to the lubricating agent, and means providing a passageway between the faces of said piston when the piston has forced substantially all of the lubricating agent out of said receptacle.

7. In a drill, the combination of a drill head, a cutter of frusto-conical form mounted in said drill head so that an element of the curved surface of said cutter is vertically disposed, and means for imparting a gyratory movement to said cutter, the base of said frusto-conical cutter being flat and provided with a plurality of cutting teeth and the edge of said cutter adjacent said base being cut to spherical form on a radius equal to the distance between the center of gyration and said vertical element of the curved face.

8. In a drill, the combination of an operating member, a drill head secured thereto, and a circular cutter carried by said head, said cutter having its axis inclined to the axis of said operating member and having a greater horizontal diameter than the diameter of said operating member and said cutter being provided with means for retaining said operating member in central position.

9. In a drill, the combination of an operating member, a head and a gyratory cutter provided with a plurality of cutting faces in parallel planes, and of different sizes, and of such dimensions that the horizontal gyratory travel of the largest face is of greater diameter than the diameter of the gyratory travel of the other cutting faces and of the head and operating member.

10. In a drill, the combination of an operating member, a head and an inclined gyratory cutter adapted to be used as a reamer and provided with a plurality of cutting portions, the lowermost portion having its greatest horizontal diameter equal substantially to the diameter of the bore hole before reaming whereby to permit said portion to act as a guide to maintain the operating member and upper portion of said cutter in central position.

11. In a drill, the combination of an operating member, a head and an inclined gyratory cutter provided with a plurality of cutting portions, the lowermost or most advanced cutting portion having its greatest horizontal diameter equal substantially to the hole being cut by said portion whereby to maintain the operating member, head and cutter in central position.

12. In a rock drill, the combination of an operating member rotatable about its own axis, located at the center of the bore hole, and an inclined cutter of smaller diameter than the bore hole, rotatable about its own axis and also about the center of the bore hole, the cutter having a part for maintaining said operating member in said central position, and both said cutter and said operating member being removable through a casing following the progress of the cutter to line the bore hole.

ROWLAND O. PICKIN.

Witnesses:
  J. C. CARPENTER,
  T. D. BUTLER.